US006351691B1

(12) United States Patent
Mansfield

(10) Patent No.: US 6,351,691 B1
(45) Date of Patent: Feb. 26, 2002

(54) I/O SIGNALING CIRCUIT

(75) Inventor: William M. Mansfield, Lafayette, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/173,362

(22) Filed: Oct. 15, 1998

(51) Int. Cl.[7] .................... G05D 11/00
(52) U.S. Cl. .................... 700/282; 340/310.01
(58) Field of Search .................... 710/8, 10; 700/11, 700/12, 22, 282; 323/285; 340/870.18, 517, 310.01; 326/80

(56) References Cited

U.S. PATENT DOCUMENTS

| | | | | | |
|---|---|---|---|---|---|
| 4,593,380 | A | * | 6/1986 | Kocher et al. | 710/31 |
| 4,737,787 | A | | 4/1988 | Ito et al. | |
| 4,771,403 | A | * | 9/1988 | Maskovyak et al. | 710/14 |
| 4,802,116 | A | * | 1/1989 | Ward et al. | 703/23 |
| 4,855,905 | A | * | 8/1989 | Estrada et al. | 709/246 |
| 4,876,517 | A | * | 10/1989 | Arcus | 330/277 |
| 4,890,013 | A | * | 12/1989 | Arcus | 327/53 |
| 4,910,659 | A | * | 3/1990 | Gates et al. | 700/21 |
| 4,912,619 | A | * | 3/1990 | Arcus | 363/49 |
| 4,933,869 | A | * | 6/1990 | Gareis et al. | 702/58 |
| 4,951,250 | A | * | 8/1990 | Cruickshank et al. | 710/12 |
| 4,985,845 | A | * | 1/1991 | Gotz et al. | 700/286 |
| 5,038,275 | A | * | 8/1991 | Dujari | 710/19 |
| 5,043,861 | A | * | 8/1991 | Diekhans et al. | 700/11 |
| 5,424,709 | A | * | 6/1995 | Tal | 340/310.01 |
| 5,440,695 | A | * | 8/1995 | Janke et al. | 700/12 |
| 5,587,863 | A | * | 12/1996 | Bergstrom et al. | 361/93.9 |
| 5,684,451 | A | | 11/1997 | Seberger et al. | |

FOREIGN PATENT DOCUMENTS

EP 0546855 * 6/1993

* cited by examiner

*Primary Examiner*—William Grant
*Assistant Examiner*—Ronald D Hartman, Jr.
(74) *Attorney, Agent, or Firm*—Chrisman, Bynum & Johnson, P.C.

(57) ABSTRACT

An I/O signaling circuit having a single path through the circuit which can be configured to operate in one of a plurality of modes. A first circuit in the I/O signaling circuit adjusts the current flowing from a power supply to ground. A second circuit adjusts the voltage between a high potential terminal and low potential potential terminal through a remote secondary processing device. A processor determines the proper mode in which the circuit is to operate and then generates signals to adjust the first and second circuits to configure the circuit.

25 Claims, 4 Drawing Sheets

I/O SIGNALING CIRCUIT

FIELD OF THE INVENTION

This invention relates to a circuit used to provide I/O signals between a first and a second device. More particularly, this invention relates to a circuit that can be configured to operate in one of multiple modes using a single path extending to the second device. Still more particularly, this invention relates to an I/O circuit in meter electronics of a Coriolis Mass flowmeter that minimizes the number of terminals needed in the meter electronics to support different secondary devices that operate in different modes.

PROBLEM

It is known to use Coriolis effect mass flowmeters to measure mass flow and other information of materials flowing through a pipeline as disclosed in U.S. Pat. No. 4,491,025 issued to J. E. Smith, et al. of Jan. 1, 1985 and Re. 31,450 to J. E. Smith of Feb. 11, 1982. These flowmeters have one or more flow tubes of a curved configuration. Each flow tube configuration in a Coriolis mass flowmeter has a set of natural vibration modes, which may be of a simple bending, torsional, radial, or coupled type. Each flow tube is driven to oscillate at resonance in one of these natural modes. The natural vibration modes of the vibrating, material filled systems are defined in part by the combined mass of the flow tubes and the material within the flow tubes. Material flows into the flowmeter from a connected pipeline on the inlet side of the flowmeter. The material is then directed through the flow tube or flow tubes and exits the flowmeter to a pipeline connected on the outlet side.

A driver applies a force to the flow tube. The force causes the flow tube to oscillate. When there is no material flowing through the flowmeter, all points along a flow tube oscillate with an identical phase. As a material begins to flow through the flow tube, Coriolis accelerations cause each point along the flow tube to have a different phase with respect to other points along the flow tube. The phase on the inlet side of the flow tube lags the driver, while the phase on the outlet side leads the driver. Pickoffs are placed at two different points on the flow tube to produce sinusoidal signals representative of the motion of the flow tube at the two points. A phase difference of the two signals received from the pickoffs is calculated in units of time.

The phase difference between the two pickoff signals is proportional to the mass flow rate of the material flowing through the flow tube or flow tubes. The mass flow rate of the material is determined by multiplying the phase difference by a flow calibration factor. This flow calibration factor is determined by material properties and cross sectional properties of the flow tube.

Meter electronics including a processor and connected memory receive the pickoff signals and execute instructions to determine the mass flow rate and other properties of the material flowing through the tube. Th meter electronics can also use the signals to monitor the properties of Coriolis flowmeter components. The meter electronics can then transmit this information to a remote secondary processing device. It is also possible for the meter electronics to receive signals from the remote secondary processing device for the purpose of modifying flowmeter operation. For purposes of the present discussion, a remote secondary processing device is any system capable of receiving signals from and/or transmitting signals to the meters electronics. The actual functions and operation of remote secondary processing devices is not covered in the scope of this invention.

It is a problem in the Coriolis flow meter field in particular and in other fields in general that different types of remote secondary processing devices may be connected to the meter electronics. Each different type of remote secondary processing device may communicate in one of several different modes. Some examples of different modes include but are not limited to digital signaling, 4–20 milliamp analog signaling, active discrete signaling, passive discreet signaling, active frequency signaling, and passive frequency signaling. For each mode supported by the meter electronics or a corresponding electronic device in another field, the meter electronics must have at least one terminal and typically two terminals connected to the circuitry needed to support the mode.

The need for separate circuits for each mode supported by the meter electronics is a problem. If the meter electronics are to be adaptable to provide signals in different modes to support each different mode, an additional circuit must be added for each mode and supported by the meter electronics. Each additional circuit adds to both the material and assembly cost of the meter electronics. Furthermore, unless a specific circuit for a specific mode is added, the specific mode cannot be supported by the meter electronics. There is a need in the Input/Output (I/O) signaling art in general and in the Coriolis flowmeter art in particular for a system that reduces the amount of circuitry in an I/O circuit while maximizing the number of modes supported by the circuitry.

SOLUTION

The above and other problems are solved and an advance in the art is achieved through the provision of an I/O signaling circuit that is capable of operating in a plurality of modes while using a single path to transmit signals to and/or receive signals from a remote secondary processing device. This allows each I/O circuit in a device to operate in any one of a plurality of modes which reduces the number of circuits needed to provide I/O signaling between a first and a second device.

An I/O signaling circuit that is capable of operating in a plurality of modes while using a single path through the circuit operates in the following manner. A power supply is connected to a high potential output terminal. A first variable impedance device, such as a transistor, is connected between the high potential output terminal and a low potential output terminal. A second variable impedance device connects the low potential terminal to a ground via a resistor.

The first variable impedance device can be opened or closed to complete a circuit between the high potential and low potential terminals of the I/O circuit to control the voltage between the high potential and low potential terminals. The second variable impedance device controls the flow of current from the power supply, through a remote secondary processing device connected to the high and low terminals to ground. The two variable impedance devices are controlled in the following manner to configure the I/O signaling circuit to operate in a particular mode. A controller executes instructions that determine the mode in which signals are to be transmitted and generates signals that configure the I/O signaling circuit.

The controller generates a first signal that is applied to the first variable impedance device. The first signal causes the first variable impedance device to complete or open a circuit which, in turn, controls the current flowing through the remote secondary processing device from the high potential terminal to the low potential terminal in series with the remote secondary processing device. In the preferred embodiment, the first signal is a digital signal that opens and closes a p-channel MOSFET transistor comprising the first variable impedance device.

A second signal is also generated by the controller. The second signal is applied to a voltage-to-current converter which, in turn, controls the second variable impedance device. The second signal causes the second variable impedance device to control the amount of current that flows through the remote secondary processing device and the series connected second variable impedance device to ground. As the current flows to ground, a resistor connected in series with the second variable impedance device causes a voltage proportional to this current to be fed back to an input of an Operational Amplifier (Op-Amp) and to an Analog to Digital (A/D) converter. The Op-Amp generates a control voltage which is applied to an input of the second variable impedance device to control the current flowing from the power supply, through the remote secondary processing device, through the second variable impedance device and the resistor to ground. The first and second signals are varied by the I/O controller to transmit or receive signals in a desired mode as set out below.

These and other advantages of the present invention will be apparent from the drawings and a reading of the detailed description thereof.

DETAILED DESCRIPTION

Figure 1:
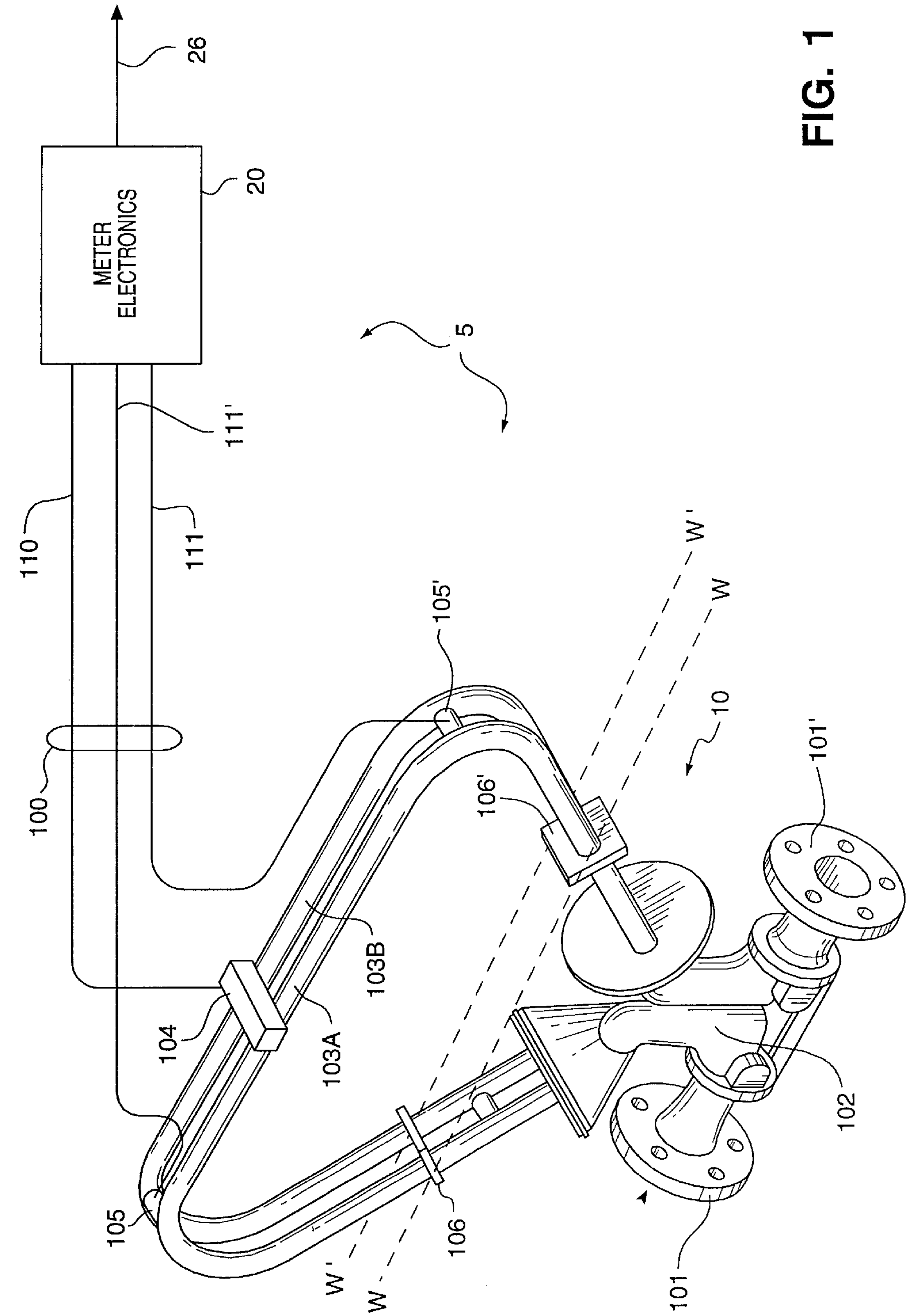
FIG. 1 is a Coriolis flow meter common in the prior art.

Coriolis Flowmeter in General—FIG. 1

FIG. 1 illustrates a Coriolis flowmeter 5 comprising a flowmeter assembly 10 and meter electronics 20. Meter electronics 20 is connected to meter assembly 10 via leads 100 to provide density, mass flow rate, volume flow rate, totalized mass flow and other information over output path 26. It should be apparent to those skilled in the art that the present invention can be used by any type of Coriolis flowmeter regardless of the number of drivers or the number of pick-off sensors.

Flowmeter assembly 10 includes a pair of flanges 101 and 101', manifold 102 and flow tubes 103A and 103B. Connected to flow tubes 103 A and 103 B are driver 104 and pick-offs 105 and 105'. Brace bars 106 and 106' define axes W and W' about which each flow tube 103A and 103B oscillates.

When flowmeter assembly 10 is inserted into a pipeline system (not shown) which carries the material being measured, material enters flowmeter assembly 10 through flange 101, passes through manifold 102 where the material is directed to enter flow tubes 103A and 103B, flows through flow tubes 103 A and 103B and back into manifold 102 where it exits meter assembly 10 through flange 101'.

Flow tubes 103A and 103B are selected and appropriately mounted to manifold 102 so as to have substantially the same mass distribution, moments of inertia, and elastic modules about bending axes W—W and W'—W' respectively. The flow tubes extend outwardly from the manifold in an essentially parallel fashion.

Flow tubes 103A–B are driven by driver 104 in phase opposition about their respective bending axes W and W' in what is termed the first out of phase bending mode. Driver 104 may comprise one of many well known arrangements, such as a magnet mounted to flow tube 103A and an opposing coil mounted to flow tube 103B. An alternating current is passed through the opposing coil to cause both tubes to oscillate. A suitable drive signal is applied by meter electronics 20, via lead 110 to driver 104. The description of FIG. 1 is provided merely as an example of the operation of a Coriolis flowmeter and is not intended to limit the teaching of the present invention.

Meter electronics 20 receives the right and left velocity signals appearing on leads 111 and 111', respectively. The present invention as described herein, can produce multiple drive signals from multiple drivers. Meter electronics 20 process left and right velocity signals to compute mass flow rate and provide the validation system of the present invention. Path 26 allows meter electronics 20 to interface with a remote secondary processing device.

Figure 2:
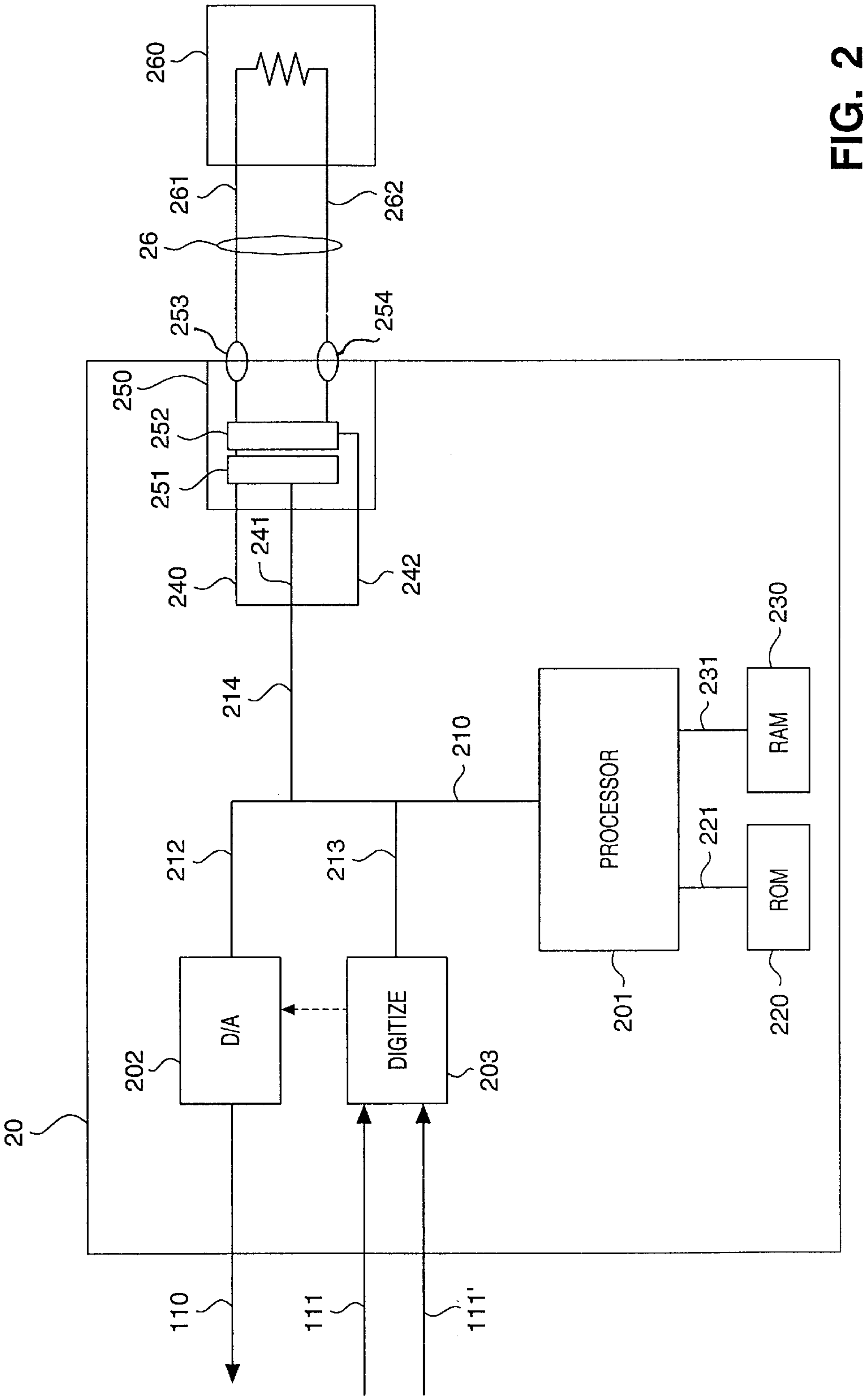
FIG. 2 is a block diagram of the meter electronics in the Coriolis flowmeter.

Meter Electronics 20 in General—FIG. 2

FIG. 2 illustrates a block diagram of the components of an exemplary embodiment of meter electronics 20 which perform the processes related to the present invention. It will be noted by those skilled in the art that the components of meter electronics 20 shown are for exemplary purposes only. It is possible to use other types of processors and electronics in conjunction with the present invention. Processor 201 reads instructions for performing the various functions of the flowmeter including but not limited to computing mass flow rate of a material, computing volume flow rate of a material, and computing density of a material under control of Read Only Memory (ROM) 220 via path 221. The data as well as instructions for performing the various functions are stored in a Random Access Memory (RAM) 230. Processor 201 performs read and write operations in RAM memory 230 via path 231.

Paths 111 and 111' transmit the left and right pickoff velocity signals from flowmeter assembly 10 to meter electronics 20. The velocity signals are received by analog to digital (A/D) convertor 203 in meter electronic 20. A/D convertor 203 converts the left and right velocity signals to digital signals usable by processor 201 and transmits the digital signals over path 213 to I/O bus 210. The digital signals are carried by I/O bus 210 to processor 201. Driver signals are transmitted over I/O bus 210 to path 212 which applies the signals to digital to analog (D/A) convertor 202. The analog signals from D/A convertor 202 are transmitted to driver 104 via path 110.

Path 26 extends signals to remote secondary processing device 260 to allow meter electronics 20 and remote secondary processing device 260 to communicate. Path 26 includes paths 261 and 262 which are connected to high potential terminal 253 and low potential potential terminal 254 of I/O signaling circuit 250. I/O signaling circuit 250 generates I/O signals. One skilled in the art will recognize that meter electronics 20 may have more than one I/O signaling circuit 250. However, only one I/O circuit 250 is shown is for purposes of clarity. Furthermore, one skilled in the art will recognize that the functions and circuitry of I/O signaling circuit 250 can be provided by any combination of circuits that can provide the functionality of I/O signaling circuit 250.

I/O signaling circuit 250 receives and transmits signals to I/O bus 210 via path 214. One skilled in the electronic signaling arts will appreciate that I/O signaling circuit 250 can be used in other devices requiring I/O signaling and is not limited to use in Coriolis flowmeter electronics 20. Path 214 includes a power supply path 240, a first data path 241, and a second data path 242. One skilled in the art will recognize that the first and second data paths 241 and 242 can be a plurality of lines in bus 214 carrying data to circuit 250 or multiplexed signals over the same lines. Power supply path 240 is connected to high potential terminal 253 by current flow control circuitry 251 and voltage control circuitry 252 of circuit 250. Low potential potential terminal 254 is connected to current flow circuitry 251 and voltage control circuitry 252 to return the current flow from a remote secondary processing device 260 to circuit 250.

Current flow control circuitry 251 controls the flow of current through I/O signaling circuit 250 to ground. Input signal 241 is received by current flow control circuitry 251 to control the amount of current flowing to ground. Voltage control circuitry 252 receives second input 242 and adjusts the voltage applied to remote secondary processing device 260 in response to the received signal.

I/O signaling circuit 250 is different from other I/O circuits of the prior art in that circuit 250 can be configured in the below described manner to provide I/O signals in one of multiple modes supported by a system with current flowing through circuit 250 over a single path to remote secondary processing device 260. This reduces the number of circuit paths through I/O signaling circuit 250 which in turn reduces the number of components needed to manufacture circuit 250. The configuration of I/O signaling circuit 250 is performed by processor 201 which executes instructions to generate and transmit the proper signals to configure I/O signaling circuit 250 for operation in the desired mode. The below description of an exemplary embodiment demonstrates how I/O signal can be configured to perform in a specific mode to using one path through circuit 250.

Figure 3:
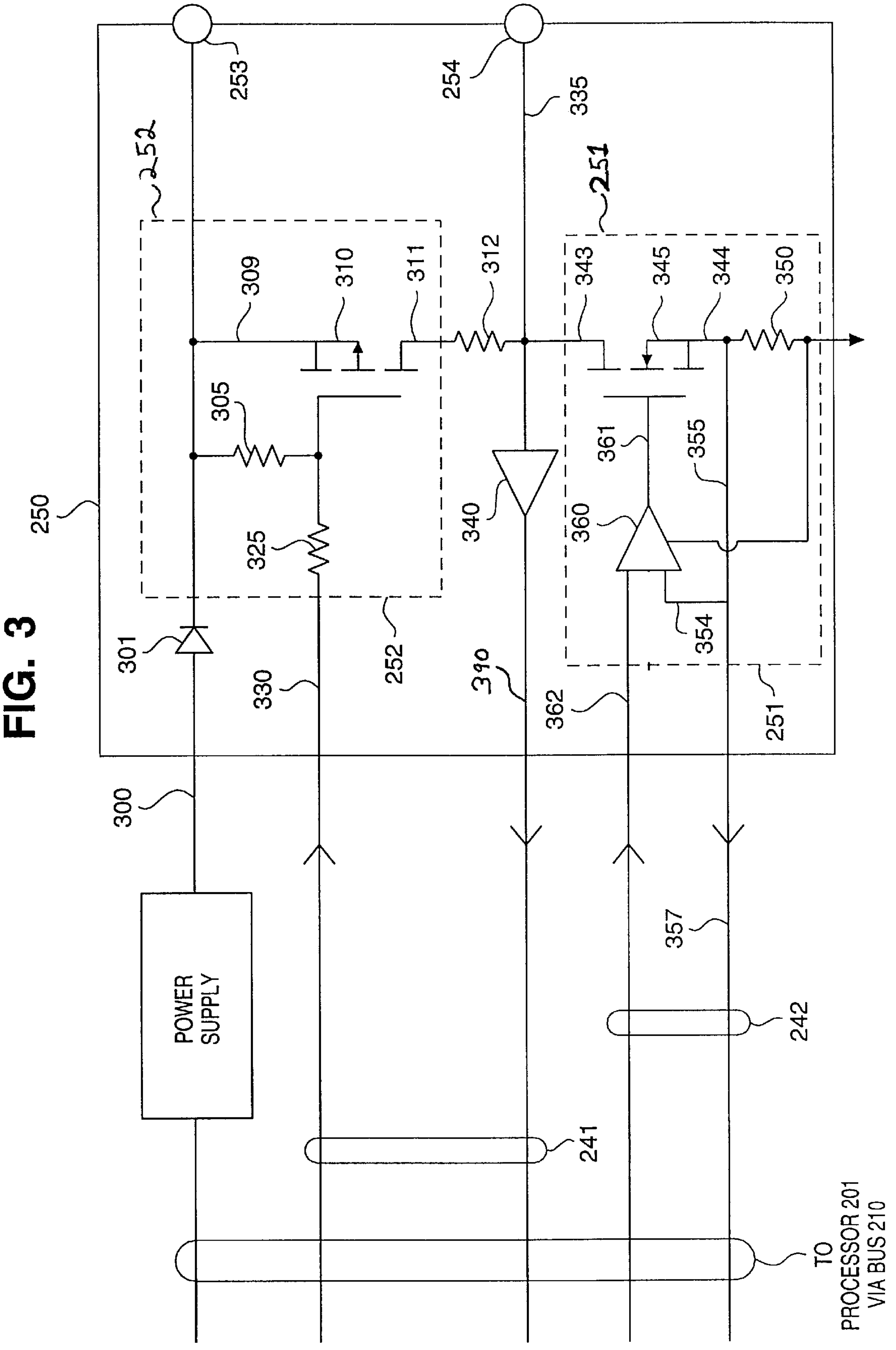
FIG. 3 is a diagram of an I/O signaling circuit of this invention.

I/O Signaling Circuit 250—FIG. 3

FIG. 3 illustrates a preferred exemplary embodiment of I/O circuit 250. One skilled in the art will recognize that there are other possible circuit configurations that can be used to gain the same results. I/O signaling circuit 250 receives a high potential over path 300 from a power supply 371. In this embodiment, the power supply is a unipolar power supply.

The positive potential extends over path 300 and through diode 301 which prevents current from flowing into the power supply when the power supply is off. Diode 301 is a conventional diode such as diode IN4001 produced by Motorola Corp. The positive potential extends to a high positive potential terminal 253. A second terminal is named low potential potential terminal 254 since its potential is less positive than that of high potential terminal 253. High potential terminal 253 and low potential potential terminal 254 are connected by path 26 of FIG. 2 to remote secondary processing device 260 to allow current to flow from I/O signaling circuit 250, though remote secondary processing device 260 and back to circuit 250.

A first variable impedance device 310 is connected between high potential terminal 253 and low potential potential terminal 254 inside I/O circuit 250. In this exemplary embodiment, first variable impedance device is a p-channel MOSFET transistor such as transistor 4P06 produced by Motorola Corp.

First variable impedance device 310 is connected to path 300 via diode 301 and path 309 and is also connected to thermal protection element 312 via path 311. Thermal protection element 312 protects the circuitry from over current. Thermal protection element 312 is an auto-resettable fuse such as part# SMD050 produced by Raychem.

A digital signal is applied by the processor 201 via path 330 and resistor 325 to open and close variable impedance device 310. Resistor 305 is connected between paths 300 and 330 through resistor 325. Resistors 305 and 325 bias variable impedance device 310. Resistors 305 and 325 are conventional resistors such as a ten Kohm metal film. It is possible to use many different strength resistor in the present invention.

Low potential potential terminal 254 is also connected to the input of comparator 340 via path 335. Comparator 340 senses the voltage level present at terminal 254 with respect to terminal 253. Path 335 passes through comparator 340 and carries the signals applied to 254 by remote secondary processing device 260 to I/O bus 210 via path 390 to processor 201.

A second variable impedance device 345 is connected via path 335 to low potential potential terminal 254. In this exemplary embodiment, second variable impedance device 345 is a n-channel MOSFET transistor. Resistor 350 is connected between second variable impedance device 345 and ground.

Path 355 extends the voltage drop across resistor 350 to an input of Op-Amp 360. Path 355 also extends the voltage across resistor 350 to a monitor(not shown). The monitor is an analog to digital convertor that converts the voltage on path 355 into digital signals that can be read by processor 201. The digital signals are then transmitted to processor 201 via I/O bus 210 of FIG. 2.

Op-amp 360 receives an analog control signal from the processor over path 362 and the voltage across resistor 350 over path 355. Op-Amp 360 compares the received signal with the voltage from resistor 350 and generates a control voltage that is applied to second impedance device 345 via path 361. The control voltage controls the amount of current that flows through second impedance device 345 to ground.

Second variable impedance device 345 and the attached circuitry are the current flow control circuitry 251 of FIG. 2. The first and second variable impedance devices 310 and 345 are adjusted by the signals from the processor to operate in one selected mode.

I/O signaling circuit 250 can be configured in the following modes by applying the following signals to the above described circuitry. The following examples are not meant to limit the functionality of I/O circuit 250. It is left to those skilled in the art to program processor 201 to operate in modes other than the exemplary modes given below.

A first mode to which I/O signaling circuit 250 can be configured provides an analog 4–20 milli-Amp output. In order to provide the 4–20 milliamp output, processor 201 does not apply a signal via path 330 to an input of first variable impedance device 310. This causes first variable impedance device 310 to remain open. The processor 201 applies via path 362 a scaled linear variable voltage to Op-Amp 360. This creates a control voltage for second variable impedance device 345 which adjusts the current flowing from the power supply via remote secondary processing device 260 to ground. The strength of the signal is adjusted by the processor to encode the data in the current flowing through remote secondary processing device 260. This allows processor 201 to change the current flowing from the high potential terminal 253 to the low potential potential terminal 254 and through remote secondary processing device 260. Remote secondary processing device 260 can then read the current being applied to determine the data being transmitted.

I/O signaling system can also be used to receive a 4–20 milli-Amp input from remote secondary processing device 260. To configure circuit 250 to operate as a 4–20 milli-Amp input, processor 201 does not apply a signal to first variable impedance device 310. The lack of a signal on it's input cause the first variable impedance device to remain open. Processor 201, element 345 and resistor 350 applies a constant voltage signal to the lower input of Op-Amp 360 which causes a constant control voltage to be generated on path 361 and applied to input of second variable impedance device 345. This allows the current flowing to be limited by elements 345 and 350, but controlled by remote secondary processing device 260. Processor 201 receives signals representing the current flow over path 335 from low potential potential terminal 254. This current flow represents the data from remote secondary processing device 260. The entire path for this current includes the series circuit comprising the power supply, path 300, diode 301, terminal 253, remote secondary processing device 260, terminal 254 & path 335, device 345 & resistor 350 to ground.

Discrete data is a mechanism for indicating a digital state. A discrete value is a one or a zero in digital terms and is indicated by the voltage across terminals 253 and 254 through remote secondary processing device 260. I/O signaling circuit 250 can be employed to encode discrete data. In order to provide an active discrete output mode, processor 201 applies a constant voltage to the upper input of Op-Amp 360 which in turn applies a constant control voltage to second variable impedance device 345. The discrete digital value is then applied by asserting or de-asserting a signal on path 330 to first variable impedance device 310. The signal causes first variable impedance device 310 to open and close. This changes the voltage state between positive potential terminal 253 and low potential potential terminal 254 to be presented to remote secondary processing device 260. The voltage indicates the data being transmitted. I/O signaling circuit 250 can also be configured in operate in an active discrete input mode for receiving data by applying a voltage signal to Op-Amp 360 to generate a constant control voltage to second variable impedance device 345. Data is then detected by the voltage detected over path 335 by comparator 340.

In a passive discrete output mode, processor 201 applies 0 voltage to Op-Amp 360 which generates a control voltage that prevents current from flowing to ground. Data is encoded by asserting or de-asserting a signal applied to first variable impedance device 310 to open or close the first variable impedance device 310. I/O signaling circuit 250 can also be configured to operate in a passive discrete input mode for receiving data by processor 201 by applying a 0 voltage signal to Op-Amp 360 to generate a constant control voltage for second variable impedance device 345. Data is then detected on the current received over path 335 through Op-Amp 340.

I/O signaling circuit 250 can also be configured to operate in active and passive frequency input and output modes. In a frequency mode, the data is a n encoded analog value. Processor 201 configures I/O circuit 250 to operate in an active frequency output mode in the following manner. Processor 201 applies a oltage to second variable impedance device 345. In order to encode data for remote secondary processing device 260, processor 201 applies a coded signal output over path 330 to first variable impedance device 310. This changes the voltage across remote secondary processing device 260. I/O signaling circuit 250 can also be configured in operate in an active frequency input mode for receiving data by applying a voltage signal to Op-Amp 360 to produce a constant control voltage for second variable impedance device 345. Data is then detected on the current received over path 335 and through comparator 340.

Processor 201 can also configure I/O circuit 250 to operate in a passive frequency output mode. Processor 201 applies a 0 volt signal to second variable impedance device 345. In order to encode data into the current applied to remote secondary processing device 260, processor 201 applies a frequency signal to first variable impedance device 310. I/O signaling circuit 250 can also be configured in operate in a passive frequency input mode for receiving data by applying a 0 voltage signal to Op-Amp 360 to generate a constant control voltage for second variable impedance device 345. Data is then detected on the current received over path 335 through Op-Amp 340.

I/O signaling circuit 250 can also be configured to transmit and receive digital data. One such digital protocol is the Bell 202 digital communications protocol. In order to configure I/O signaling circuit to operate in the digital mode, processor 201 does not apply a signal to first variable impedance device 310 to prevent first impedance device 310 from completing a circuit between positive potential terminal 253 and low potential potential terminal 254. A scaled, linear variable signal is applied to Op-Amp 360 with 1200 Hz/2200 Hz data superimposed on the signal. Transmit data is received over path 335 through comparator 340.

Figure 4:
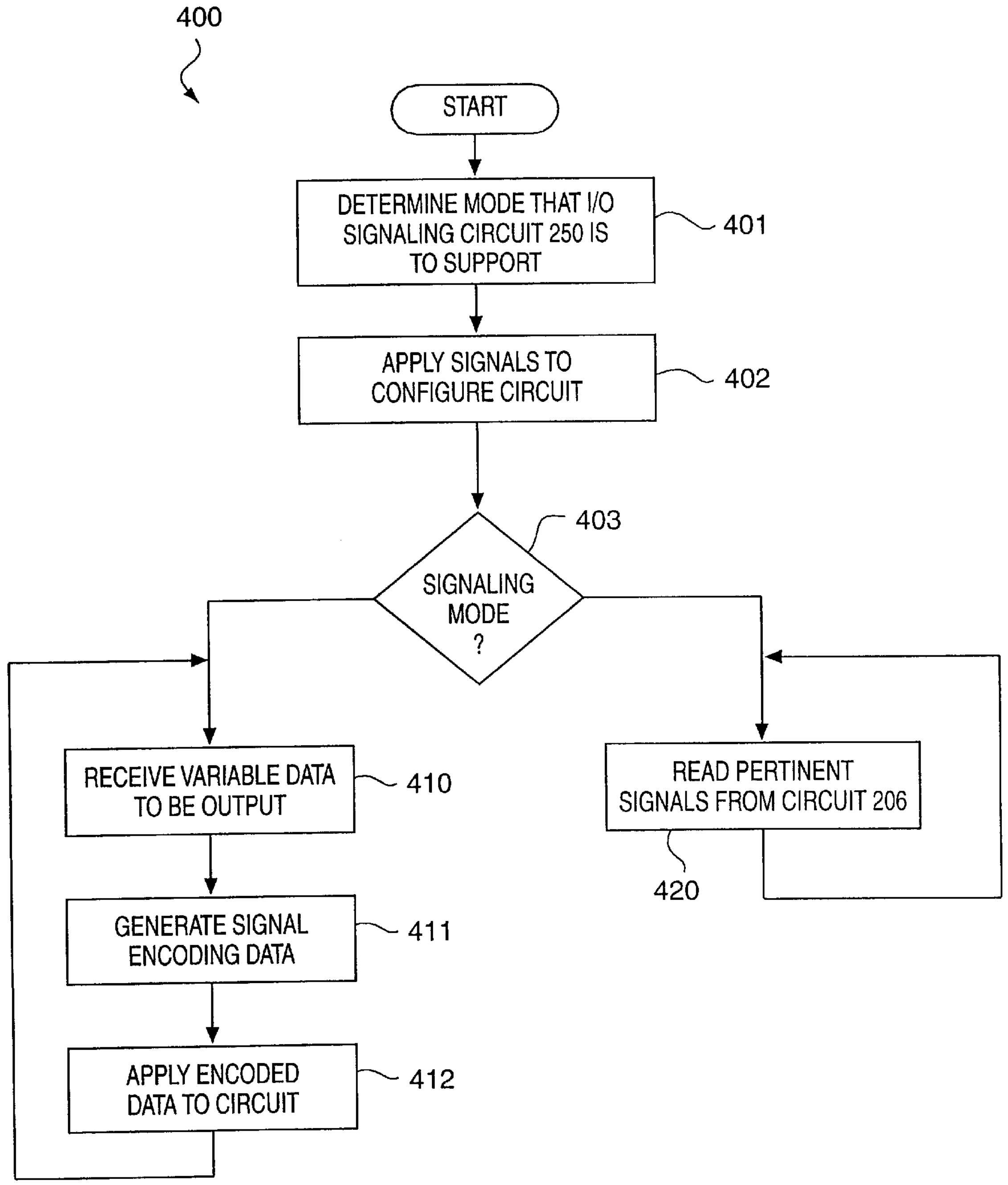
FIG. 4 is a flow diagram of the process of configuring the I/O signaling circuit to operate in a selected mode.

Method for Configuring an I/O Circuit—FIG. 4.

FIG. 4 illustrates the operational steps taken by processor 201 in a process for configuring I/O signaling circuit 250. Process 400 begins in step 401 by determining which mode I/O signaling circuit 250 is to support. In step 402 the signals needed to configure the circuit are applied to I/O signaling circuit 250. In step 403, processor 201 determines whether the mode to be supported is an input or an output mode. If the mode to be supported is an input mode, processor 201 reads the pertinent signals from I/O signaling circuit 250 in step 420. Step 420 is repeated until the mode of circuit 250 is changed by processor 201.

If the signaling mode to be supported is an input mode, steps 410–412 are executed. In step 410, processor 201 receives the data to be output. The signal encoded data is generated in step 411 and applied to I/O signals circuit 250 in step 412. Steps 410–412 are repeated until circuit 250 is configured to operate in another mode.

The above is a description of an I/O signaling circuit having a single path through the circuit that can be configured to operate in one of a plurality of modes. It is expected that those skilled in the art can and will design alternative I/O signaling circuits that infringe on this invention as set forth in the claims below either literally or through the Doctrine of Equivalents.

What is claimed is:

1. An integrated I/O signaling circuit capable of operating in one of a plurality of modes for bi-directionally exchanging information over a single path with a remote secondary processing device, said I/O signaling circuit comprising:

a power supply having a ground and a high potential output;

a high potential terminal that receives said high potential from said power supply;

a low potential terminal;

a first variable impedance device connected between said high potential terminal and said low potential terminal;

a second variable impedance device connected between said low potential terminal and ground;

a first circuit for controlling the impedance of said first variable impedance device;

a second circuit for controlling the impedance of said second variable impedance device; and wherein said first circuit and said second circuit and said first variable impedance device and said second variable impedance device configure said I/O signaling circuit to operate in one of said plurality of modes for exchanging signals with said remote secondary processing device over said single path.

2. The integrated I/O signaling circuit of claim 1 characterized in that said first circuit controls the voltage between said high potential terminal and said low potential terminal; and said second circuit controls current flow between said low potential terminal and ground.

3. The integrated I/O signaling circuit of claim 2 characterized in that said second circuit comprises:

a first resistor having one side connected to ground; and a first transistor connected between said low potential terminal and another side of said first resistor.

4. The integrated I/O signaling circuit of claim 3 characterized in that said second circuit further comprises:

an operational amplifier that receives an analog control signal from said another side of said first resistor and generates a control voltage that is applied to an input gate of said first transistor to control the current flow said through said first transistor of said second circuit.

5. The integrated I/O signaling circuit of claim 4 characterized in that said second circuit further comprises a first monitor path connected to said another side of said first resistor.

6. The integrated I/O signaling circuit of claim 2 characterized in that said first circuit comprises:

a first transistor connected between said high potential terminal and said low potential terminal that receives a digital signal to control the impedance of said first transistor of said first circuit.

7. The integrated I/O signaling circuit of claim 6 characterized in that said first circuit further comprises a first biasing resistor connected between said high potential terminal and an input of said first transistor of said first circuit to generate a bias for said first transistor of said first circuit.

8. The integrated I/O signaling circuit of claim 7 characterized in that said first circuit further comprises:

a second biasing resistor that extends said input signal to said input of first transistor of said first circuit.

9. The integrated I/O signaling circuit of claim 6 characterized in that said first transistor of said first circuit is a source to drain transistor and said first circuit further comprises:

a fuse connected between an output of said first transistor of said first circuit and said low potential terminal.

10. The circuit of claim 1 characterized in that said power supply is connected in series with a diode to said high potential terminal to prevent a reverse current from flowing into said power supply when said power supply is in an off condition.

11. The circuit of claim 1 wherein said plurality of modes includes:

a 4–20 milliamp Output mode.

12. The circuit of claim 1 wherein said plurality of modes includes:

a 4–20 milliamp In put mode.

13. The circuit of claim 1 wherein said plurality of modes includes:

an active discrete output mode.

14. The circuit of claim 1 wherein said plurality of modes includes:

a passive discrete output mode.

15. The circuit of claim 1 wherein said plurality of modes includes:

an active frequency output mode.

16. The circuit of claim 1 wherein said plurality of modes includes:

a passive frequency output mode.

17. The circuit of claim 1 wherein said plurality of modes includes:

a digital mode.

18. The circuit of claim 1 wherein said plurality of mode s includes:

an active input discrete mode.

19. The circuit of claim 1 wherein said plurality of modes includes:

a passive discrete input mode.

20. The circuit of claim 1 wherein said plurality of modes includes:

a passive frequency input mode.

21. The circuit of claim 1 wherein said plurality of modes includes:

an active frequency input mode.

22. The circuit of claim 1 wherein said integrated I/O signaling circuit is incorporated into meter electronics of a Coriolis mass flowmeter.

23. A method for configuring an integrated I/O signaling circuit to operate in one of a plurality of modes comprising the steps of:

applying a first signal to an input of said first transistor connected between a high potential terminal and a low potential terminal to control a voltage between said high potential terminal and low potential terminal;

applying a second signal to an input of a second transistor connected between a low potential terminal and a resistor having one terminal connected to ground to control the flow of current from said low potential terminal through said second transistor to ground; and applying power to said single path in response to the application of said first and second signals to said inputs of said transistors.

24. The method of claim 23 further comprising the steps of:

determining which one of a plurality of modes is to be provided by said integrated I/O circuit;

generating said first signal and said second signal with a processor in response to said determination of said one of said plurality of modes to be provided; and transmitting said first signal to said input of said first transistor and said second signal to an input of said second transistor.

25. The integrated I/O signaling circuit of claim 1 wherein said single path is a pair of wires common to all of said modes.

* * * * *

UNITED STATES PATENT AND TRADEMARK OFFICE

CERTIFICATE OF CORRECTION

PATENT NO. : 6,351,691 B1

DATED : February 26, 2002

INVENTOR(S) : William M. Mansfield

It is certified that error appears in the above-identified patent and that said Letters Patent is hereby corrected as shown below:

Column 7,
Line 63, replace "Processor 201 applies a oltage to second variable impedance" with
-- Processor 201 applies a voltage to second variable impedance --

Signed and Sealed this

Twentieth Day of August, 2002

*Attest:*

JAMES E. ROGAN

*Attesting Officer* *Director of the United States Patent and Trademark Office*